(12) United States Patent
Toyooka

(10) Patent No.: US 10,770,029 B2
(45) Date of Patent: Sep. 8, 2020

(54) DISPLAY DEVICE AND METHOD OF CONTROLLING DISPLAY DEVICE

(71) Applicant: SEIKO EPSON CORPORATION, Tokyo (JP)

(72) Inventor: Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 102 days.

(21) Appl. No.: 15/991,373

(22) Filed: May 29, 2018

(65) Prior Publication Data

US 2018/0278901 A1    Sep. 27, 2018

Related U.S. Application Data

(63) Continuation of application No. 14/084,005, filed on Nov. 19, 2013, now Pat. No. 10,009,584.

(30) Foreign Application Priority Data

Nov. 28, 2012   (JP) .................................. 2012-260083

(51) Int. Cl.
*G09G 5/10*    (2006.01)
*H04N 9/31*    (2006.01)
(Continued)

(52) U.S. Cl.
CPC ........... *G09G 5/10* (2013.01); *G03B 21/2053* (2013.01); *H04N 9/3155* (2013.01);
(Continued)

(58) Field of Classification Search
CPC .... G09G 5/10; G03B 21/2053; G03B 21/006; H04N 9/3155; H04N 9/3182; H04N 9/3161
See application file for complete search history.

(56) References Cited

U.S. PATENT DOCUMENTS 6,104,509 A    8/2000  Yoshida
8,797,253 B2 *  8/2014  Iwasaki ................ G09G 3/3406
                                                    345/102
(Continued)

FOREIGN PATENT DOCUMENTS

JP    2004-354717 A    12/2004
JP    2011-085693 A    4/2011

OTHER PUBLICATIONS

Apr. 1, 2016 Office Action issued in U.S. Appl. No. 14/084,005.
(Continued)

*Primary Examiner* — Premal R Patel
(74) *Attorney, Agent, or Firm* — Oliff PLC

(57) ABSTRACT

A display device includes a solid-state light source driven by a PWM signal, a light modulation device that modulates light emitted by the solid-state light source in response to an image signal, and a signal output unit that determines a duty ratio and a current value of the PWM signal in response to brightness of an image represented by the image signal. The signal output unit outputs a PWM signal having a predetermined first current value to the solid-state light source if the duty ratio is equal to or more than a predetermined first threshold value and outputs a PWM signal having a current value less than the first current value to the solid-state light source if the duty ratio is less than the first threshold value.

8 Claims, 10 Drawing Sheets

(51) Int. Cl.
*G03B 21/20* (2006.01)
*G03B 21/00* (2006.01)

(52) U.S. Cl.
CPC ......... *H04N 9/3161* (2013.01); *H04N 9/3182* (2013.01); *G03B 21/006* (2013.01)

(56) References Cited

U.S. PATENT DOCUMENTS

| | | |
|---|---|---|
| 9,019,194 B2 | 4/2015 | Seo |
| 2005/0007306 A1 | 1/2005 | Ilsaka et al. |
| 2011/0298834 A1* | 12/2011 | Shin .................... G09G 3/3406 345/690 |
| 2012/0086628 A1* | 4/2012 | Ichioka ................. G09G 3/342 345/102 |
| 2012/0105515 A1* | 5/2012 | Iwasaki ............... G09G 3/3406 345/691 |
| 2014/0042919 A1* | 2/2014 | Yang .................. H05B 33/0839 315/186 |

OTHER PUBLICATIONS

Aug. 26, 2016 Office Action issued in U.S. Appl. No. 14/084,005.
Jun. 16, 2017 Office Action issued in U.S. Appl. No. 14/084,005.
Feb. 3, 2015 Office Action issued in U.S. Appl. No. 14/084,005.
Sep. 11, 2015 Office Action issued in U.S. Appl. No. 14/084,005.
Mar. 1, 2018 Notice of Allowance issued in U.S. Appl. No. 14/084,005.

* cited by examiner

DISPLAY DEVICE AND METHOD OF CONTROLLING DISPLAY DEVICE

The entire disclosure of Japanese Patent Application No. 2012-260083, filed Nov. 28, 2012, is expressly incorporated by reference herein.

BACKGROUND

1. Technical Field

The present invention relates to a display device and a method of controlling the display device.

2. Related Art

As the invention of controlling brightness of a displayed image by controlling lighting time of a solid-state light source, there is a display device disclosed in Patent Document 1 (JP-A-2004-354717), for example. The display device uses an LED (Light Emitting Diode) as a light source and obtains lighting time of the light source per field based on input image signals. The display device lengthens the lighting time of the light source when a necessary amount of light per field is larger, and shortens the lighting time of the light source when the necessary amount of light per field is smaller.

As the solid-state light source of the display device, there is an LD (Laser Diode) light source other than the LED, for example. The LD light source has a property that the amount of light changes depending on the temperature. In the case where the drive current is constant, the amount of light increases when the junction temperature is lower and the amount of light decreases when the junction temperature is higher. When the lighting time is controlled as in the display device of Patent Document 1, and the lighting time is lengthened and the state of the larger amount of light continues, the junction temperature rises. In this case, even if the lighting times per field are the same, when the time elapses, the amount of light changes due to the temperature rise. Further, when the lighting time is shortened and the state of the smaller amount of light continues, the junction temperature falls. In this case, even if the lighting times per field are the same, when the time elapses, the amount of light changes due to the temperature fall.

SUMMARY

An advantage of some aspects of the invention is to suppress changes in brightness even when lighting time of a solid-state light source changes.

A display device according to an aspect of the invention includes a solid-state light source driven by a PWM signal, a light modulation device that modulates light emitted by the solid-state light source in response to an image signal, and a signal output unit that determines a duty ratio and a current value of the PWM signal in response to brightness of an image represented by the image signal, and outputs a PWM signal having a predetermined first current value to the solid-state light source if the duty ratio is equal to or more than a predetermined first threshold value and outputs a PWM signal having a current value less than the first current value to the solid-state light source if the duty ratio is less than the first threshold value.

According to the configuration, even when the lighting time of the solid-state light source is changed by changing the duty ratio, the current value of the PWM signal is changed, and thereby, changes in brightness may be suppressed with respect to the image obtained by the light modulation device.

In the display device, the signal output unit may output a PWM signal having a second current value smaller than the first current value if the duty ratio is less than a second threshold value smaller than the first threshold value, and output a PWM signal having a current value equal to or more than the second current value and less than the first current value in response to the duty ratio if the duty ratio is equal to or more than the second threshold value and less than the first threshold value.

According to the configuration, if the duty ratio is equal to or more than the second threshold value and less than the first threshold value, the current value is changed in response to the duty ratio, and thereby, the image may be made brighter compared to the case where the current value is fixed to the second current value.

In the display device, a photodetector that detects an amount of light emitted by the solid-state light source may be provided, and the signal output unit may have a table in which a correspondence relationship between the brightness and the duty ratio is specified, update the table in response to the amount of light detected by the photodetector, and determine the duty ratio of the PWM signal based on the updated table.

In the display device, the signal output unit may update the table by changing the brightness corresponding to the duty ratio of the second threshold value in the table.

According to the configuration, even when the relationship between the duty ratio and the amount of light emitted by the solid-state light source due to temporal changes, the brightness when the duty ratio is set to the second threshold value is changed in response to the detection result of the amount of light of the solid-state light source, and thereby, variations in amount of light due to temporal changes may be suppressed.

In the display device, the signal output unit may output a PWM signal having a second current value smaller than the first current value if the duty ratio is less than the first threshold value.

According to the configuration, the current value is set to the first current value or the second current value, and thereby, the configuration for changing the current value may be made simpler.

A method of controlling a display device according to another aspect of the invention is a method of controlling a display device including a solid-state light source driven by a PWM signal, and a light modulation device that modulates light emitted by the solid-state light source in response to an image signal, including determining a duty ratio and a current value of the PWM signal in response to brightness of an image represented by the image signal, outputting a PWM signal having a predetermined first current value to the solid-state light source if the duty ratio is equal to or more than a predetermined first threshold value, and outputting a PWM signal having a current value less than the first current value to the solid-state light source if the duty ratio is less than the first threshold value.

According to the configuration, even when the lighting time of the solid-state light source is changed by changing the duty ratio, the current value of the PWM signal is changed, and thereby, changes in brightness may be suppressed with respect to the image obtained by the light modulation device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
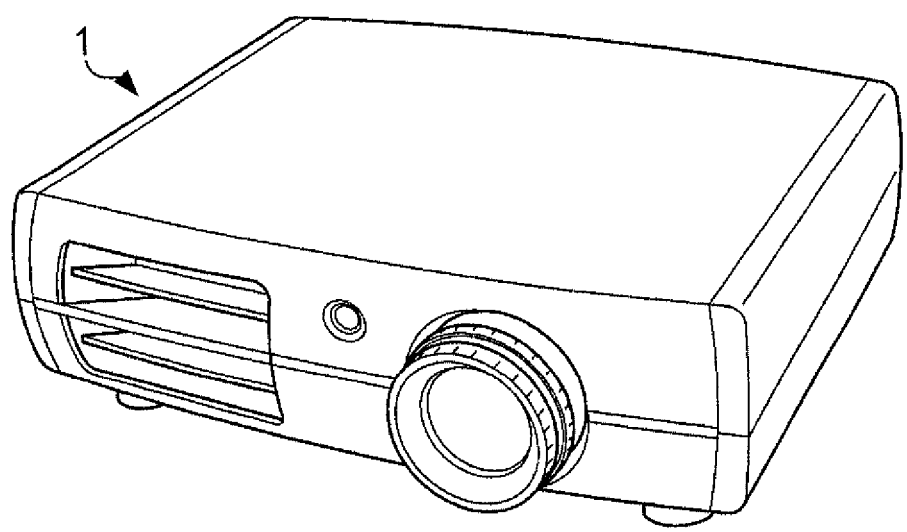
FIG. 1 is an appearance diagram of a projector.

FIG. 1 is an appearance diagram of a projector 1 according to an embodiment of the invention. The projector 1 is a liquid crystal projector and a display device that projects and displays an image represented by input image signals on a screen. The projector 1 has laser diodes as a light source, and has three reflective liquid crystal panels for red light, green light, and blue light as light modulation devices.

Figure 2:
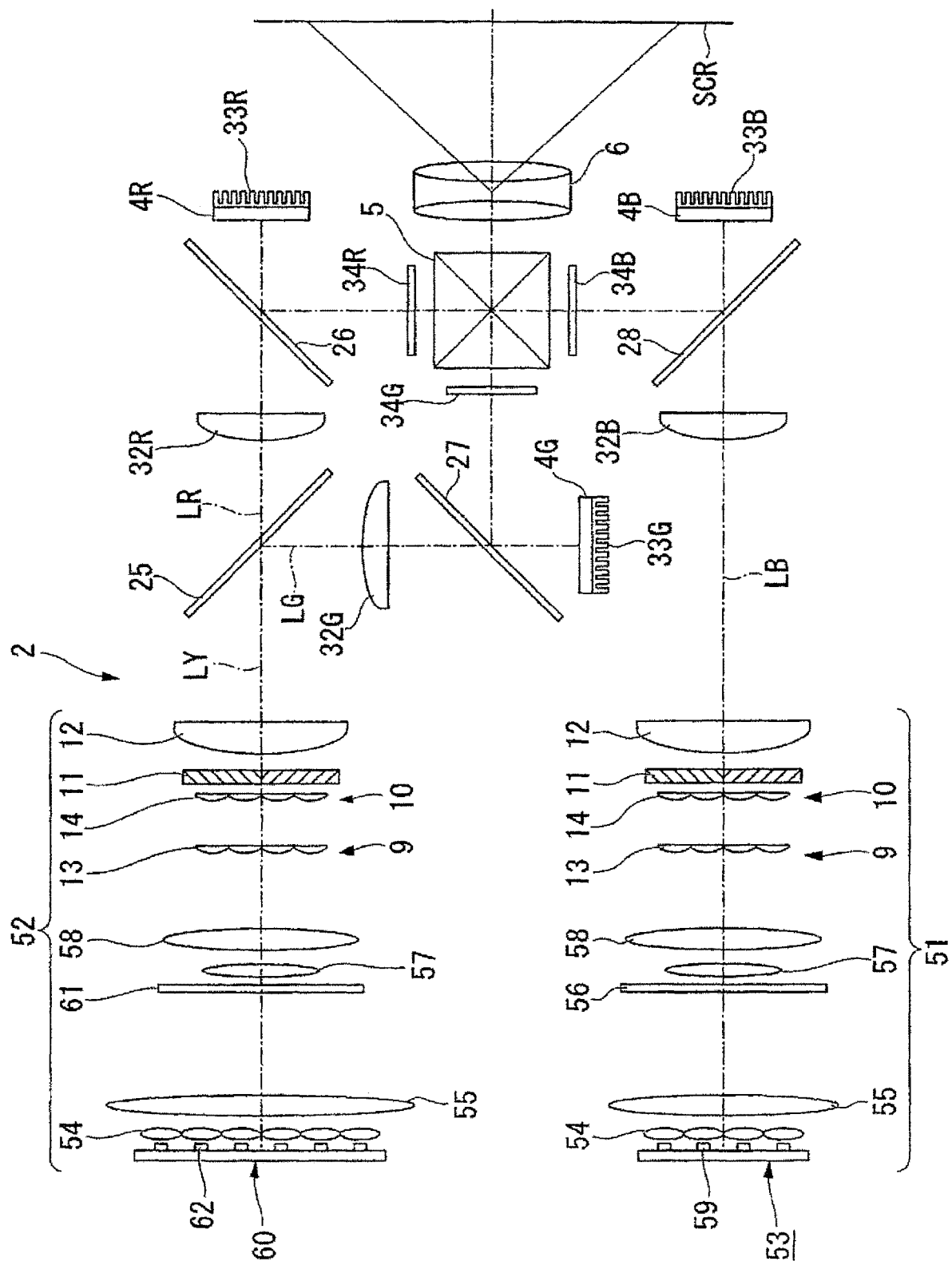
FIG. 2 shows a configuration of an optical system of the projector.

FIG. 2 shows a configuration of an optical system 2 of the projector 1. A blue light illumination device 51 shown in FIG. 2 is a device that outputs blue light LB. The blue light illumination device 51 has a blue laser diode array 53, a parallelizing lens 54, a condenser lens 55, a diffuser 56, a pickup lens 57, a parallelizing lens 58, a first lens array 9, a second lens array 10, a polarization conversion element 11, and a superimposing lens 12.

The blue laser diode array 53 has a plurality of blue laser diodes 59 outputting blue light arranged in an array with rows and columns. The blue light output from the blue laser diode 59 enters the parallelizing lens 54. The parallelizing lens 54 is a lens that parallelizes the entering blue light. The blue light transmitted through the parallelizing lens 54 enters the condenser lens 55. The condenser lens 55 is a lens that condenses the blue light parallelized by the parallelizing lens 54. The blue light condensed by the condenser lens 55 enters the diffuser 56.

The diffuser 56 diffuses incident light and the blue light entering from the condenser lens 55 is diffused by the diffuser 56 and enters the pickup lens 57. The pickup lens 57 is a lens that condenses incident light. The blue light condensed by the pickup lens 57 enters the parallelizing lens 58. The parallelizing lens 58 is a lens that parallelizes incident light. The blue light parallelized by the parallelizing lens 58 enters the first lens array 9.

The first lens array 9 has a plurality of first lenses 13 arranged in a matrix with rows and columns, and has a function of dividing the blue light from the parallelizing lens 58 into luminous fluxes. The blue light transmitted through the first lens array 9 enters the second lens array 10. The second lens array 10 has a plurality of second lenses 14 arranged in a matrix with rows and columns, and has a function of condensing the blue light transmitted through the first lens array 9 to a reflective liquid crystal panel 4B with the superimposing lens 12. The blue light transmitted through the second lens array 10 enters the polarization conversion element 11.

The polarization conversion element 11 is an element that aligns polarization directions of the lights divided by the first lens array 9. The polarization conversion element 11 transmits one linearly-polarized light component (e.g., P-polarized light) of the entering light and converts the other linearly-polarized light component (e.g., S-polarized light) into the one linearly-polarized light component. The superimposing lens 12 is a lens that condenses the light transmitted through the polarization conversion element 11. The blue light LB as the light condensed by the superimposing lens 12 is output from the blue light illumination device 51 and enters a lens 32B. Note that, not all of the lights output from the polarization conversion element 11 are aligned with one polarized light, but the other polarized light is mixed.

The lens 32B is a lens that parallelizes the entering blue light LB. The blue light parallelized by the lens 32B enters a polarization beam splitter 28. The polarization beam splitter 28 divides luminous flux and has a function of transmitting P-polarized light and reflecting S-polarized light. The blue light transmitted through the polarization beam splitter 28 enters the reflective liquid crystal panel 4B.

Next, a yellow light illumination device 52 will be explained. The yellow light illumination device 52 is a device that outputs yellow light LY. The yellow light illumination device 52 has an excitation laser diode array 60, the parallelizing lens 54, the condenser lens 55, a phosphor substrate 61, the pickup lens 57, the parallelizing lens 58, the first lens array 9, the second lens array 10, the polarization conversion element 11, and the superimposing lens 12. Note that, of the parts of the yellow light illumination device 52, the same parts as those of the blue light illumination device 51 have the same signs as those of the parts of the blue light illumination device 51, and their explanation will be omitted.

The excitation laser diode array 60 has a plurality of excitation laser diodes 62 outputting ultraviolet light arranged in an array with rows and columns. The ultraviolet light output from the excitation laser diodes 62 enters the parallelizing lens 54. Note that the light output from the excitation laser diode 62 may be blue light, not ultraviolet light.

The ultraviolet light transmitted through the parallelizing lens 54 and the condenser lens 55 enters the phosphor substrate 61. The phosphor substrate 61 has a phosphor layer that receives excitation light such as ultraviolet light or blue light and emits yellow light formed on a substrate. When the ultraviolet light transmitted through the condenser lens 55 reaches the phosphor substrate 61, yellow light is emitted from the phosphor substrate 61, and the yellow light enters the pickup lens 57. The yellow light LY as light transmitted through the pickup lens 57, the parallelizing lens 58, the first lens array 9, the second lens array 10, and the polarization conversion element 11 and condensed by the superimposing lens 12 is output from the yellow light illumination device 52 and enters a dichroic mirror 25.

The dichroic mirror 25 is an optical element that reflects luminous flux in a predetermined wavelength range and transmits luminous fluxes in other wavelength ranges. The dichroic mirror 25 transmits red light LR of a red component contained in the yellow light LY and reflects green light LG of a green component. The red light LR transmitted through the dichroic mirror 25 reaches a lens 32R and the green light LG reflected by the dichroic mirror 25 reaches a lens 32G.

The lens 32R is a lens that parallelizes the red light LR. The red light LR parallelized by the lens 32R enters a polarization beam splitter 26. The polarization beam splitter 26 divides luminous flux and has a function of transmitting P-polarized light and reflecting S-polarized light. The P-polarized red light transmitted through the polarization beam splitter 26 enters a reflective liquid crystal panel 4R.

Similarly, the lens 32G is a lens that parallelizes the green light LG. The green light LG parallelized by the lens 32G enters a polarization beam splitter 27. The polarization beam splitter 27 divides luminous flux and has a function of transmitting P-polarized light and reflecting S-polarized light. The P-polarized green light transmitted through the polarization beam splitter 27 enters a reflective liquid crystal panel 4G.

The reflective liquid crystal panel 4R, the reflective liquid crystal panel 4G, and the reflective liquid crystal panel 4B modulate incident light in response to input image signals. The reflective liquid crystal panel 4R, the reflective liquid crystal panel 4G, and the reflective liquid crystal panel 4B each have pixels arranged in rows and columns and a reflection layer provided at the opposite side to the side that light enters for reflecting light. Note that, in the reflective liquid crystal panel 4R, the reflective liquid crystal panel 4G, and the reflective liquid crystal panel 4R, a radiator fin 33R, a radiator fin 33G, and a radiator fin 33B are provided at the opposite sides to the sides that light enters.

The reflective liquid crystal panel 4B applies voltages in response to input image signals to the respective pixels. In the pixel, the orientation state of liquid crystal molecules changes in response to the applied voltage. For example, in the case where the liquid crystal is perpendicularly oriented, when the applied voltage is set to 0 V, the polarization state does not change when incident light (P-polarized light) is transmitted through the liquid crystal, and P-polarized light is output from the reflective liquid crystal panel 4B. On the other hand, when the applied voltage is set to 5 V, the polarization state changes when incident light (P-polarized light) is transmitted through the liquid crystal, and S-polarized light is output from the reflective liquid crystal panel 4B. Further, when the voltage applied to the pixel is set to an intermediate voltage between 0 V and 5 V, light as mixture of P-polarized light and S-polarized light is output from the reflective liquid crystal panel 4B.

The S-polarized light output from the reflective liquid crystal panel 4B is reflected by the polarization beam splitter 28, and then, transmitted through a polarizer 34B and enters a cross dichroic prism 5. Note that the actions of the reflective liquid crystal panel 4R and the reflective liquid crystal panel 4G are the same as that of the reflective liquid crystal panel 4B, and the S-polarized red light output from the reflective liquid crystal panel 4R is reflected by the polarization beam splitter 26, and then, transmitted through a polarizer 34R and enters the cross dichroic prism 5. Further, the S-polarized green light output from the reflective liquid crystal panel 4G is reflected by the polarization beam splitter 27, and then, transmitted through a polarizer 34G and enters the cross dichroic prism 5.

The cross dichroic prism 5 is an optical element that combines the lights transmitted through the polarizer 34R, the polarizer 34G, and the polarizer 34B and forms a color image. The color image formed by the light combined by the cross dichroic prism 5 is enlarged and projected on the screen SCR by a projection system 6.

Note that, though not illustrated in FIG. 2, a component that absorbs the light reflected in the opposite direction to the direction of the cross dichroic prism 5 in the polarization beam splitter 27 may be provided in the optical system 2.

Figure 3:
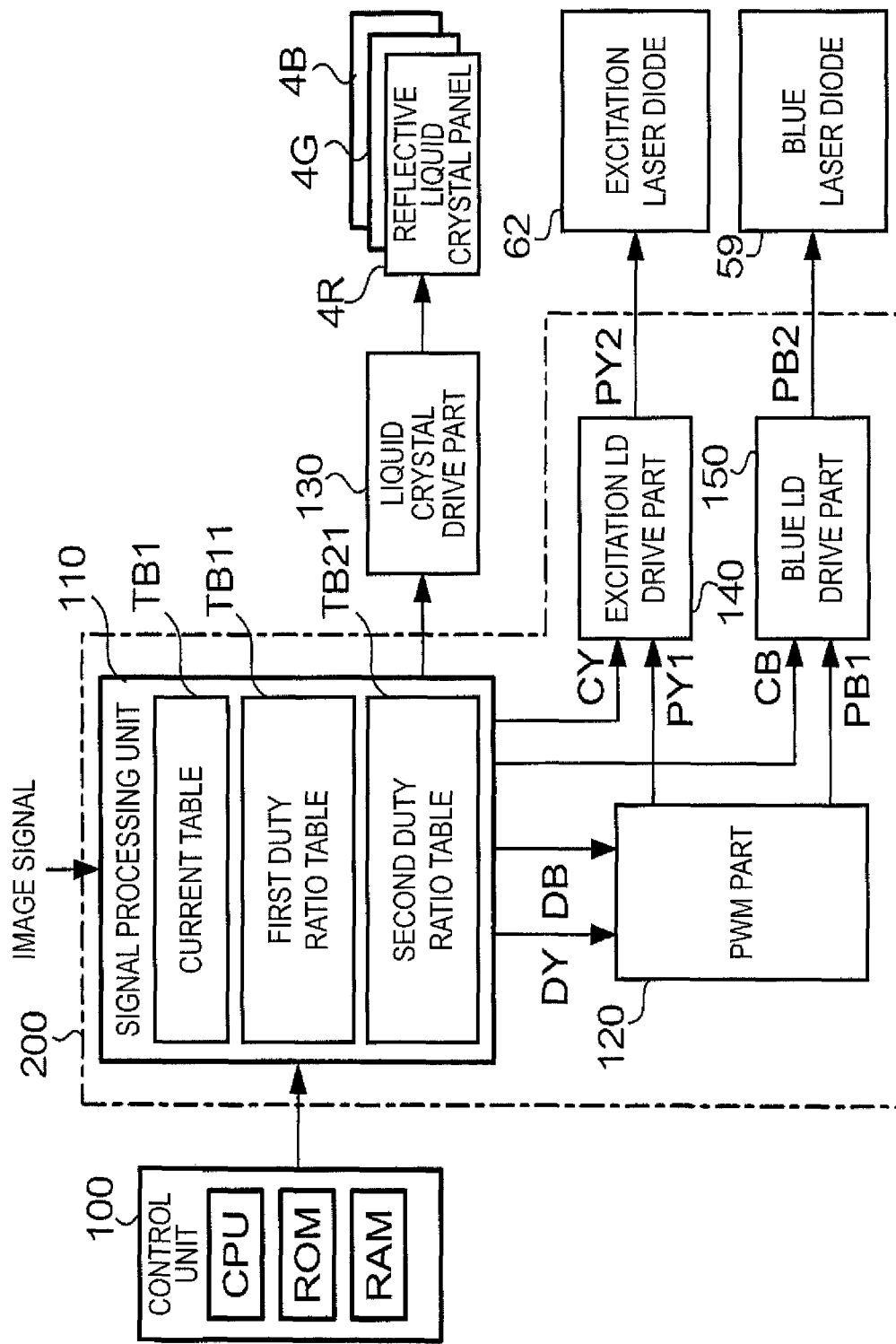
FIG. 3 is a block diagram showing a hardware configuration of the projector.

Next, a hardware configuration of the projector 1 will be explained. FIG. 3 is a block diagram showing the hardware configuration that controls the reflective liquid crystal panel 4R, the reflective liquid crystal panel 4G, the reflective liquid crystal panel 4B, the excitation laser diodes 62, and the blue laser diodes 59 in the projector 1.

A control unit 100 is a microcomputer including a CPU (Central Processing Unit), a ROM (Read Only Memory), a RAM (Random Access Memory), etc., and operates according to programs stored in the ROM. The control unit 100 has a function of controlling a signal processing unit 110 in response to the operation performed using an operation button (not shown) and adjusting images to be projected.

The signal processing unit 110 outputs various kinds of signals to a PWM part 120, a liquid crystal drive part 130, an excitation LD drive part 140, and a blue LD drive part 150. The signal processing unit 110 acquires image signals representing a color image. The signal processing unit 110 is controlled by the control unit 100, and performs adjustment of contrast, brightness, color density, hue, color temperature, etc. of the image representing by the acquired image signals. The signal processing unit 110 outputs the image signals representing the adjusted image to the liquid crystal drive part 130.

The liquid crystal drive part 130 acquires the image signals output from the signal processing unit 110. The liquid crystal drive part 130 drives the reflective liquid crystal panel 4R, the reflective liquid crystal panel 4G, the reflective liquid crystal panel 113 so that the image represented by the acquired image signals may be projected.

Further, the signal processing unit 110 outputs various kinds of signals to the PWM part 120, the excitation LD drive part 140, and the blue LD drive part 150 for adjustment of the brightness of the image to be projected. The signal processing unit 110 has a current table TB1, a first duty ratio table TB11, and a second duty ratio table TB21 for outputting various kinds of signals.

Figure 4:
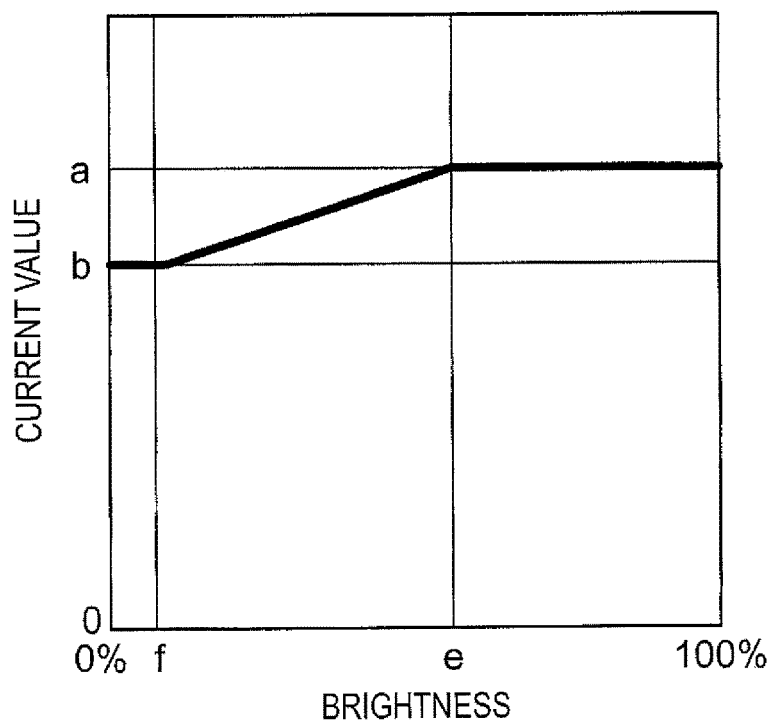
FIG. 4 shows contents stored in a current table.

The current table TB1 stores a relationship between brightness of an adjusted image and current value of a PWM (Pulse Width Modulation) signal for driving the excitation laser diodes 62 at the brightness as exemplified in FIG. 4. Specifically, the current table TB1 stores current values of PWM signals for driving the excitation laser diodes 62 at brightness in correspondence with image brightness. Note that, in the current table TB1, the image brightness from the minimum brightness to the maximum brightness is normalized to be from 0% to 100%.

Figure 5:
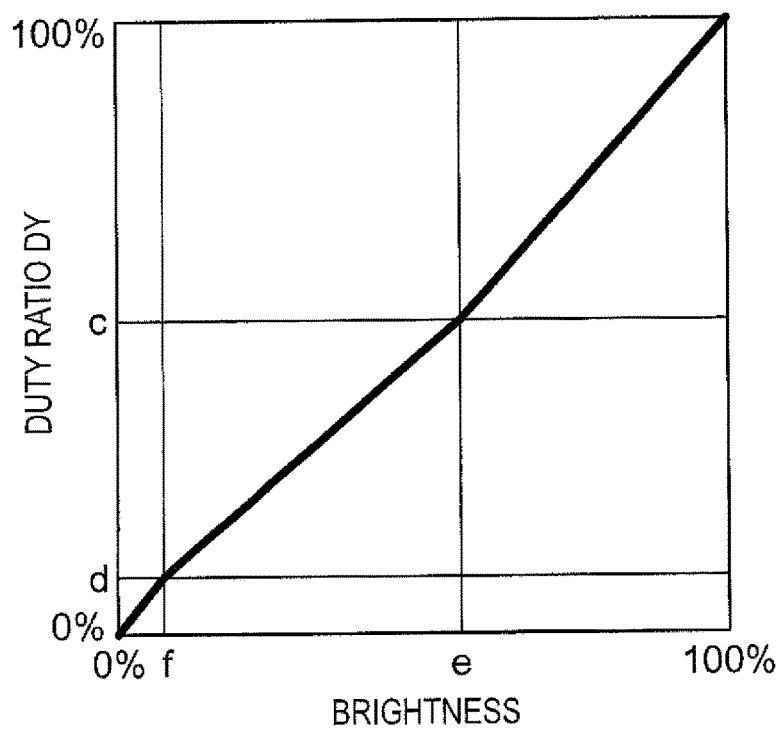
FIG. 5 shows contents stored in a first duty ratio table.

The first duty ratio table TB11 stores a relationship between brightness of an adjusted image and duty ratio DY of a PWM signal PY2 for driving the excitation laser diodes 62 at the brightness as exemplified in FIG. 5. In the embodiment, the period in which the excitation laser diodes 62 are lighted in the display period of the image for one field is controlled in response to the image brightness.

Figure 6:
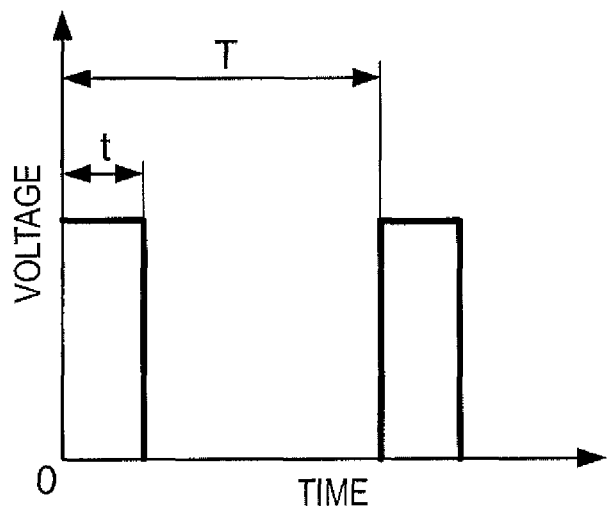
FIG. 6 shows an example of a waveform of a PWM signal.

FIG. 6 shows an example of a waveform of a PWM signal. As shown in FIG. 6, suppose that the period for one field is T and the lighting period of the excitation laser diodes 62 is t, the duty ratio of the PWM signal is expressed by t/T. The first duty ratio table TB11 stores duty ratios DY of PWM signals PY2 at brightness in correspondence with image brightness.

Figure 7:
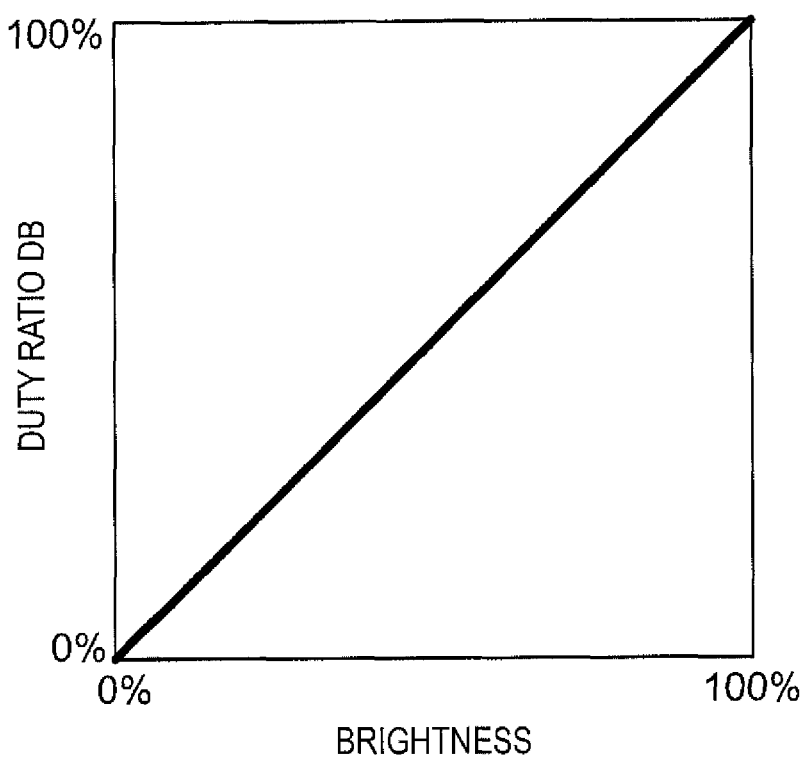
FIG. 7 shows contents stored in a second duty ratio table.

The second duty ratio table TB21 stores a relationship between brightness of an adjusted image and duty ratio DB of a PWM signal PB2 for driving the blue laser diodes 59 at the brightness as exemplified in FIG. 7. In the embodiment, the period in which the blue laser diodes 59 are lighted in the period for one field for image display is controlled in response to the image brightness. The second duty ratio table TB21 stores duty ratios DB of PWM signal PB2 at brightness in correspondence with the image brightness.

The signal processing unit 110 specifies the maximum brightness in the image for one field with respect to each field of the image signals, and extracts the duty ratio DY of the PWM signal PY2 and the duty ratio DB of the PWM signal PB2 at the specified brightness from the first duty ratio table TB11 and the second duty ratio table TB21. The signal processing unit 110 outputs the duty ratio DY extracted from the first duty ratio table TB11 and the duty ratio DB extracted from the second duty ratio table TB21 to the PWM part 120.

Further, the signal processing unit 110 specifies the maximum brightness in the image for one field with respect to each field of the image signals, and extracts the current value CY of the PWM signal PY2 from the current table TB1 at the specified brightness. The signal processing unit 110 outputs the current value CY extracted from the current table TB1 to the excitation LD drive part 140. Note that, in the embodiment, the PWM signal PB2 for driving the blue laser diodes 59 is fixed to a predetermined current value (1A in the embodiment). The signal processing unit 110 outputs the predetermined current value CB to the blue LD drive part 150.

The PWM part 120 acquires the duty ratio DY and the duty ratio DB output from the signal processing unit 110. The PWM part 120 outputs PWM signals. The PWM part 120 generates a PWM signal PB1 having the acquired duty ratio DB and outputs the generated PWM signal PB1 to the blue LD drive part 150. Further, the PWM part 120 generates a PWM signal PY1 having the acquired duty ratio DY and outputs the generated PWM signal PY1 to the excitation LD drive part 140.

The excitation LD drive part 140 acquires the PWM signal PY1 output from the PWM part 120 and the current value CY output from the signal processing unit 110. The excitation LD drive part 140 sets the current value of the acquired PWM signal PY1 to the acquired current value CY and outputs the signal as the PWM signal PY2. The blue LD drive part 150 acquires the PWM signal PB1 output from the PWM part 120 and the current value CB output from the signal processing unit 110. The blue LD drive part 150 sets the current value of the acquired PWM signal PB1 to the acquired current value CB and outputs the signal as the PWM signal PB2.

The excitation laser diodes 62 are driven by the PWM signal PY2 output from the excitation LD drive part 140 and light in response to the PWM signal PY2. Further, the blue laser diodes 59 are driven by the PWM signal PB2 output from the blue LD drive part 150 and light in response to the PWM signal PB2.

As described above, the signal processing unit 110, the PWM part 120, the excitation LD drive part 140, and the blue LD drive part 150 cooperate, and thereby, a signal output unit 200 that outputs the PWM signal PY2 to the excitation laser diodes 62 and outputs the PWM signal PB2 to the blue laser diodes 59 is realized.

Next, an operation example of the projector 1 will be explained. If the maximum brightness in the image for one field is less than f (f=9% in the embodiment) shown in FIG. 4, the signal processing unit 110 sets the current value CY to b (b=2.0 A in the embodiment). Further, if the maximum brightness in the image for one field is less than f, the signal processing unit 110 sets the duty ratio DY to be larger as the brightness is brighter as shown in FIG. 5. Furthermore, if the maximum brightness in the image for one field is less than f, the signal processing unit 110 sets the current value CB to a predetermined current value and sets the duty ratio DB to be larger as the brightness is brighter as shown in FIG. 7.

That is, in the embodiment, if the maximum brightness in the image for one field is less than f, the current values of the PWM signal PY2 and the PWM signal PB2 are set to constant current values and the duty ratios of the PWM signal PY2 and the PWM signal PB2 are changed in response to the image brightness.

If the maximum brightness in the image for one field is equal to or more than f and less than e (e=60% in the embodiment) shown in FIG. 4, the signal processing unit 110 sets the current value CY to be larger as the brightness is brighter. Further, if the maximum brightness in the image for one field is equal to or more than f and less than e, the signal processing unit 110 sets the duty ratio DY to be larger as the brightness is brighter as shown in FIG. 5. Note that, as shown in FIG. 5, regarding the duty ratio DY, in the range in which the maximum brightness in the image for one field is equal to or more than f and less than e, the gradient of the graph is different from that in the range less than f. Furthermore, if the maximum brightness in the image for one field is equal to or more than f and less than e shown in FIG. 4, the signal processing unit 110 sets the current value CB to a predetermined current value CB, and sets the duty ratio DB to be larger as the brightness is brighter as shown in FIG. 7.

That is, in the embodiment, if the maximum brightness in the image for one field falls within the range equal to or more than f and less than e, the current value of the PWM signal PY2 is changed in response to the image brightness and the duty ratios of the PWM signal PY2 and the PWM signal PB2 are changed in response to the image brightness. Note that, in the embodiment, if the brightness is f, the duty ratio DY is set to d (d=10% in the embodiment).

If the maximum brightness in the image for one field is equal to or more thane shown in FIG. 4, the signal processing unit 110 sets the current value CY to a (a=2.3 A in the embodiment) and sets the duty ratio DY to be larger as the brightness is brighter. Note that, regarding the duty ratio DY, as shown in FIG. 5, in the range in which the maximum brightness in the image for one field is equal to or more than e, the gradient of the graph is different from those in the range less than f or in the range equal to or more than f and less than e. Furthermore, if the maximum brightness in the image for one field is equal to or more than e, the signal processing unit 110 sets the current value CB to a predetermined current value, and sets the duty ratio DB to be larger as the brightness is brighter as shown in FIG. 7.

That is, in the embodiment, if the maximum brightness in the image for one field is equal to or more than e, the current values of the PWM signal PY2 and the PWM signal PB2 are set to constant current values and the duty ratios of the PWM signal PY2 and the PWM signal PB2 are changed in response to the image brightness. Note that, in the embodiment, if the brightness is e, the duty ratio DY is set to c (c=55% in the embodiment).

Figure 8:
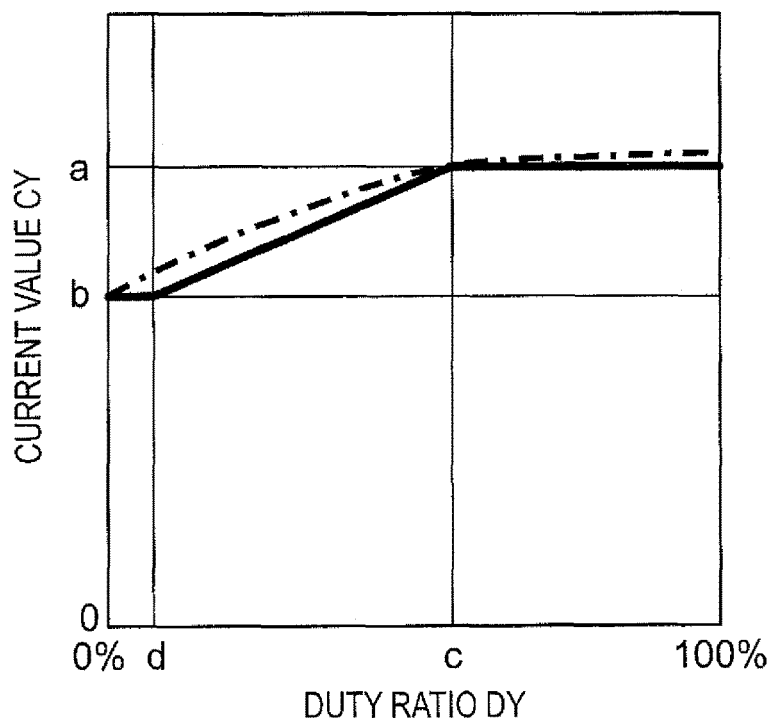
FIG. 8 shows relationships between duty ratio and current value.

FIG. 8 is a graph showing relationships between duty ratio DY and current value CY in the embodiment. The dashed-dotted line shown in FIG. 8 shows a relationship between the duty ratio DY and the maximum value of the current of the PWM signal PY2 allowed at the duty ratio DY, and the solid line shows a relationship between the duty ratio DY of the PWM signal PY2 and the current value CY of the PWM signal PY2.

When the laser diodes are driven by the PWM signal, if the duty ratio of the PWM signal is set to be larger (if the light emission time in one field is set to be longer), the junction temperature becomes higher and the amount of light output from the laser diodes becomes smaller. Accordingly, in the range in which the duty ratio is equal to or more than c (55%), the signal processing unit 110 sets the current value CY of the PWM signal PY2 to a (2.3 A) and sets the current value of the PWM signal PY2 to be larger, and thereby, reduction of the amounts of red light and green light due to temperature rise is suppressed.

Further, when the laser diodes are driven by the PWM signal, if the duty ratio of the PWM signal is set to be smaller (if the light emission time in one field is set to be shorter), the junction temperature becomes lower and the amount of light output from the laser diodes becomes larger. Accordingly, the signal processing unit 110 sets the current value CY of the PWM signal PY2 to be smaller in response to the duty ratio DY, and thereby, increase of the amounts of red light and green light due to temperature fall is suppressed.

Furthermore, as shown in FIG. 8, the current value of the PWM signal PY2 is smaller than the maximum value of the allowable current value, and thus, the amount of light output from the excitation laser diodes 62 is not too much larger and breakage of the excitation laser diodes 62 may be prevented.

Figure 9:
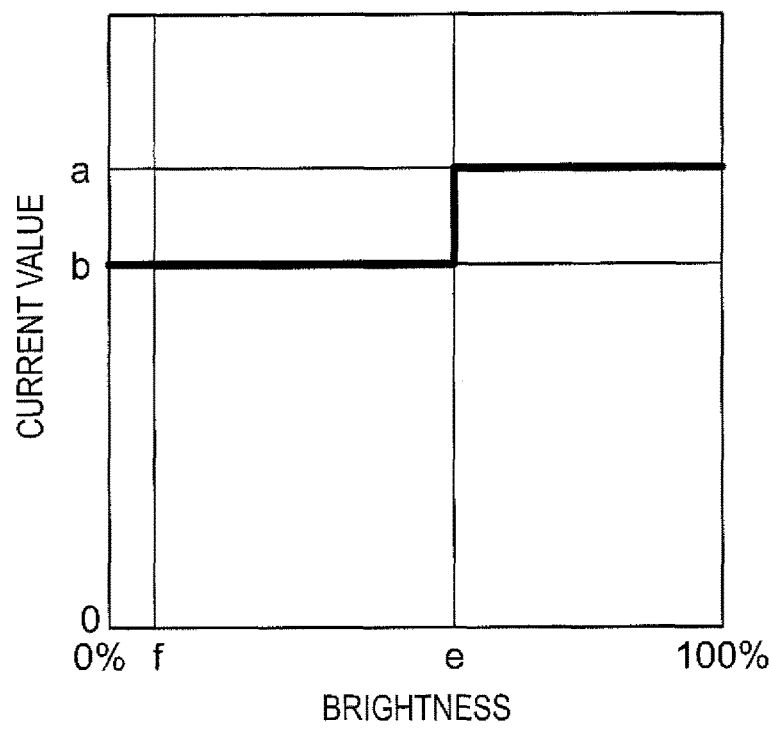
FIG. 9 shows a modified example of the current table.

Note that the contents of the respective tables shown in FIGS. 4, 6, 7 are just examples, not limited to those shown in the drawings. For example, regarding the second duty ratio table TB21, the gradients of graphs may be set to be different among the range in which the brightness is less than f, the range in which the brightness is equal to or more than f and less than e, and the range in which the brightness is more than e. Note that, in the case of the configuration, the current value CB may be determined based on the current table TB1. Further, regarding the current table TB1, as shown in FIG. 9, the current value may be set to b with respect to the range in which the brightness is less than e and the current value may be set to a with respect to the range in which the brightness is equal to or more than e.

Note that, in the case where the excitation laser diodes 62 and the blue laser diodes 59 are not lighted in the period in which the reflective liquid crystal panel 4R, the reflective liquid crystal panel 4G, and the reflective liquid crystal panel 4B are scanned, but the diodes are intermittently lighted in the period without the scanning, the maximum value of the duty ratio becomes smaller than c. However, in the above described embodiment, in the range in which the duty ratio is smaller than c, the current value CY is set to be larger as the brightness is brighter, and thus, the image may be made brighter than that in the configuration in which the current value is fixed to b.

Second Embodiment

Next, the second embodiment of the invention will be explained. A projector 1 according to the second embodiment has a photodetector that detects the red light reflected by the polarization beam splitter 26 and a photodetector that detects the blue light reflected by the polarization beam splitter 28, and is different from that of the first embodiment in that a table showing a relationship between image brightness and duty ratio and a table showing a relationship between image brightness and current value are generated (updated) in response to the detection results of the photodetectors. Accordingly, in the following explanation, the configurations in common with the first embodiment have the same signs and their explanation will be omitted.

Figure 10:
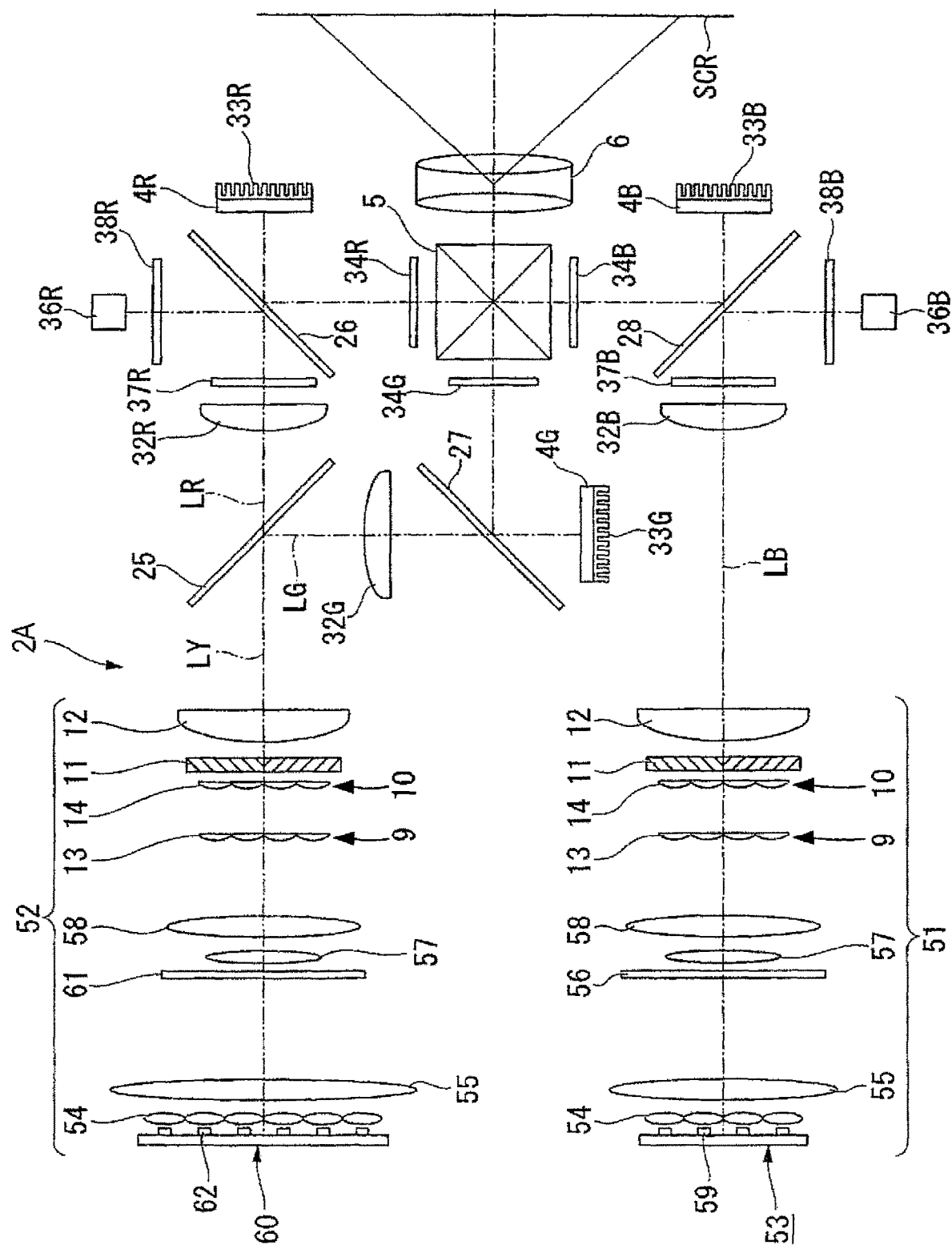
FIG. 10 shows a configuration of an optical system.

FIG. 10 shows a configuration of an optical system 2A according to the second embodiment. The optical system 2A has a diaphragm 37R, a diaphragm 38R, a photodetector 36R, a diaphragm 37B, a diaphragm 38B, and a photodetector 36B in addition to the configuration of the optical system 2.

The diaphragm 37R is provided between the polarization beam splitter 26 and the lens 32R. Of the red lights transmitted through the lens 32R, the red light at a smaller incident angle with respect to the diaphragm 37R passes through an aperture part of the diaphragm 37R and enters the polarization beam splitter 26, and the red light at a larger incident angle with respect to the diaphragm 37R is unable to pass through the aperture part and blocked. Further, a layer that absorbs light is formed on a surface facing the polarization beam splitter 26 side in the diaphragm 37R. The light reflected by the reflective liquid crystal panel 4R and transmitted through the polarization beam splitter 26 is absorbed by the layer.

The diaphragm 38R is provided in a location where the S-polarized light reflected by the polarization beam splitter 26 reaches. Of the red lights reflected by the polarization beam splitter 26, the red light at a smaller incident angle with respect to the diaphragm 38R passes through an aperture part of the diaphragm 38R, and the red light at a larger incident angle with respect to the diaphragm 38R is unable to pass through the aperture part and blocked.

The photodetector 36R is provided in a location where the light that has passed through an aperture part of the diaphragm 38R reaches. The photodetector 36R detects the amount of red light passing through the diaphragm 38R and outputs a signal S1 representing the detected amount of light to the signal processing unit 110.

The diaphragm 37B is provided between the polarization beam splitter 28 and the lens 32B. Of the blue lights transmitted through the lens 32B, the blue light at a smaller incident angle with respect to the diaphragm 37B passes through an aperture part of the diaphragm 37B and enters the polarization beam splitter 28, and the blue light at a larger incident angle with respect to the diaphragm 37B is unable to pass through the aperture part and blocked. Further, a layer that absorbs light is formed on a surface facing the polarization beam splitter 28 side in the diaphragm 37B. The light reflected by the reflective liquid crystal panel 4B and transmitted through the polarization beam splitter 28 is absorbed by the layer.

The diaphragm 38B is provided in a location where the S-polarized light reflected by the polarization beam splitter 28 reaches. Of the blue lights reflected by the polarization beam splitter 28, the blue light at a smaller incident angle with respect to the diaphragm 38B passes through an aperture part of the diaphragm 38B, and the blue light at a larger incident angle with respect to the diaphragm 38B is unable to pass through the aperture part and blocked.

The photodetector 36B is provided in a location where the light that has passed through an aperture part of the diaphragm 38B reaches. The photodetector 36B detects the amount of blue light passing through the diaphragm 38B and outputs a signal S2 representing the detected amount of light to the signal processing unit 110.

Note that, though not illustrated in FIG. 10, a component that absorbs the light reflected in the opposite direction to the direction of the cross dichroic prism 5 in the polarization beam splitter 27 may be provided in the optical system 2A.

Figure 11:
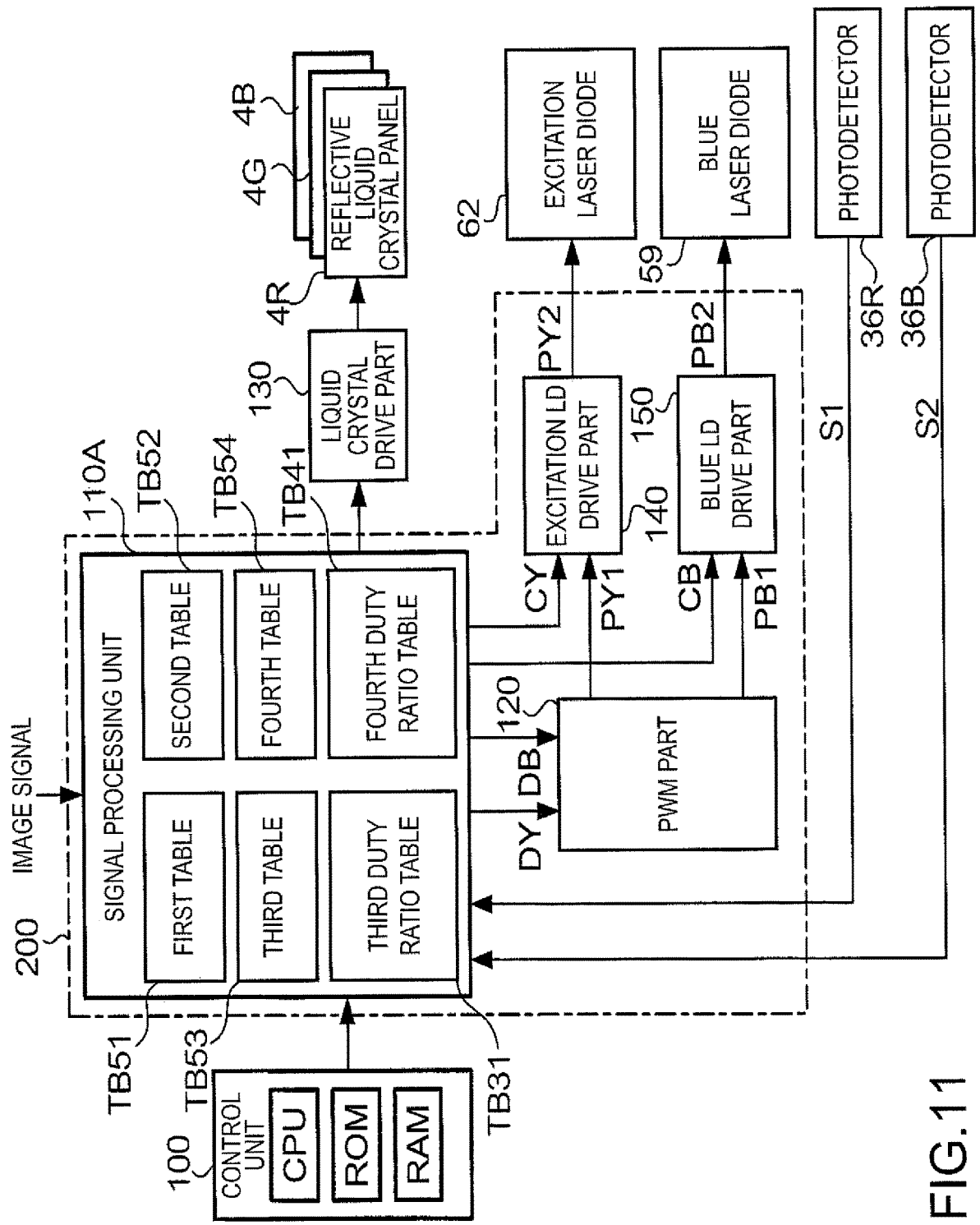
FIG. 11 is a block diagram showing a hardware configuration of a projector of the second embodiment.

Next, a hardware configuration of the projector 1 will be explained. FIG. 11 is a block diagram showing the hardware configuration that controls the reflective liquid crystal panel 4R, the reflective liquid crystal panel 4G, the reflective liquid crystal panel 4B, the excitation laser diodes 62, and the blue laser diodes 59 in the second embodiment. As shown in FIG. 11, a signal processing unit 110A according to the embodiment acquires the signal S1 output from the photodetector 36R and the signal S2 output from the photodetector 36B.

Figure 12:
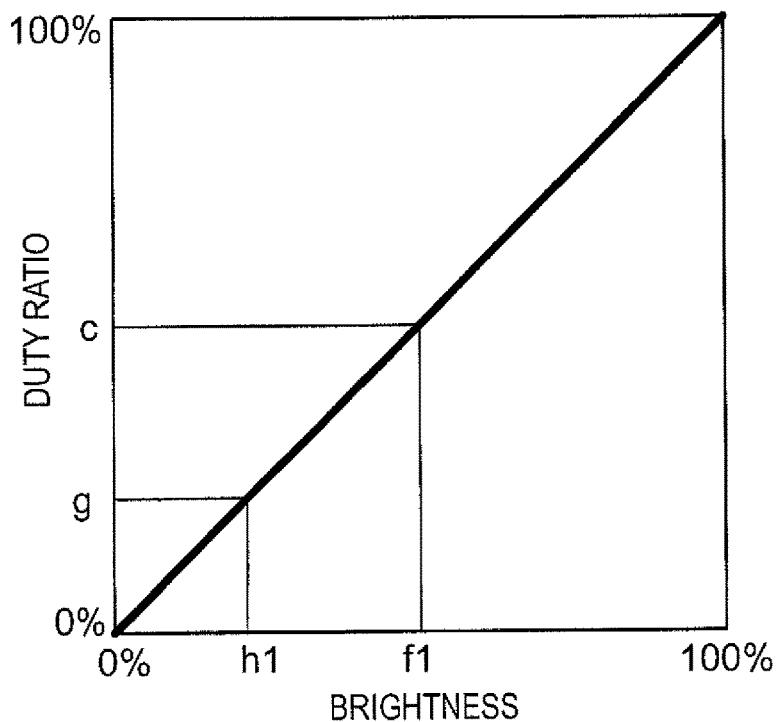
FIG. 12 shows contents stored in a third duty ratio table.
Figure 13:
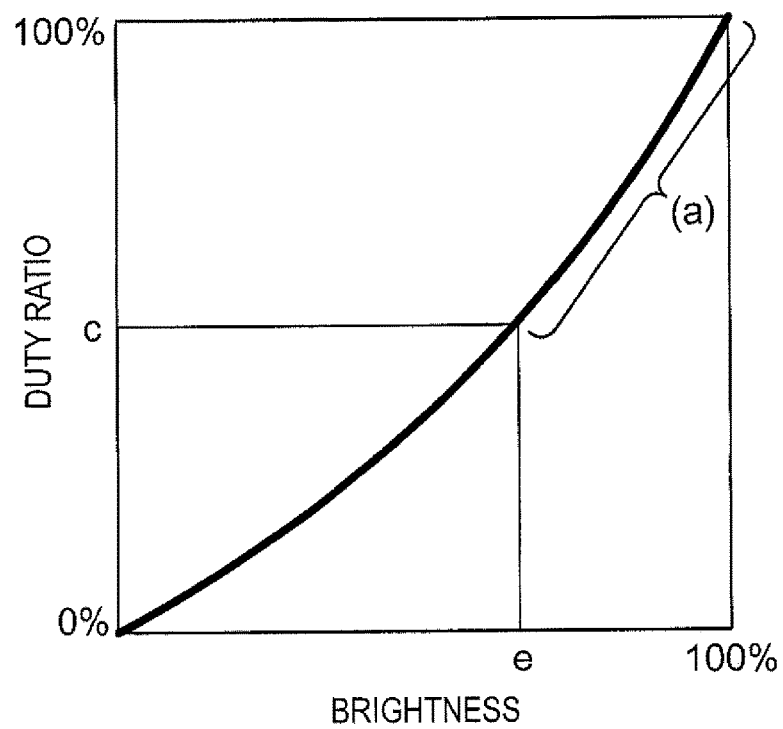
FIG. 13 shows contents stored in a fourth duty ratio table.

The signal processing unit 110A stores a third duty ratio table TB31 and a fourth duty ratio table TB41 for outputting various kinds of signals. The third duty ratio table TB31 shows a relationship between brightness of an image adjusted by the signal processing unit 110A and duty ratio of a PWM signal as exemplified in FIG. 12. Note that the graph shown in FIG. 12 is when the current value of the PWM signal is fixed to b (b=2.0 A in the embodiment). The fourth duty ratio table TB41 shows a relationship between brightness of an image adjusted by the signal processing unit 110A and duty ratio of a PWM signal as exemplified in FIG. 13. Note that the graph shown in FIG. 13 is when the current value of the PWM signal is fixed to a (a=2.5 A in the embodiment).

As shown in the drawings, in the embodiment, when the current value of the PWM signal is set to b, the relationship between the image brightness and the duty ratio is linear, and, when the current value of the PWM signal is set to a, the relationship between the image brightness and the duty ratio is nonlinear.

Further, the signal processing unit 110A generates and stores a first table TB51, a second table TB52, a third table TB53, and a fourth table TB54. The first table TB51 represents a relationship between image brightness and current value CY, and the second table TB52 represents a relationship between image brightness and duty ratio DY. The third table TB53 represents a relationship between image brightness and current value CB, and the fourth table TB54 represents a relationship between image brightness and duty ratio DB. The contents of the first table TB51 to the fourth table TB54 will be described later.

Next, an operation example of the signal processing unit 110A according to the embodiment will be explained. The signal processing unit 110A generates the first table TB51 to the fourth table TB54 when the power of the projector 1 is turned on. Note that the processing of generating the first table TB51 to the fourth table TB54 is not limited to when the power is turned on but may be generated when the power is turned off or at an arbitrary time from when the power is turned on to when the power is turned off. Further, the respective tables may be generated when a user performs operation of commanding generation of the respective tables.

Figure 14:
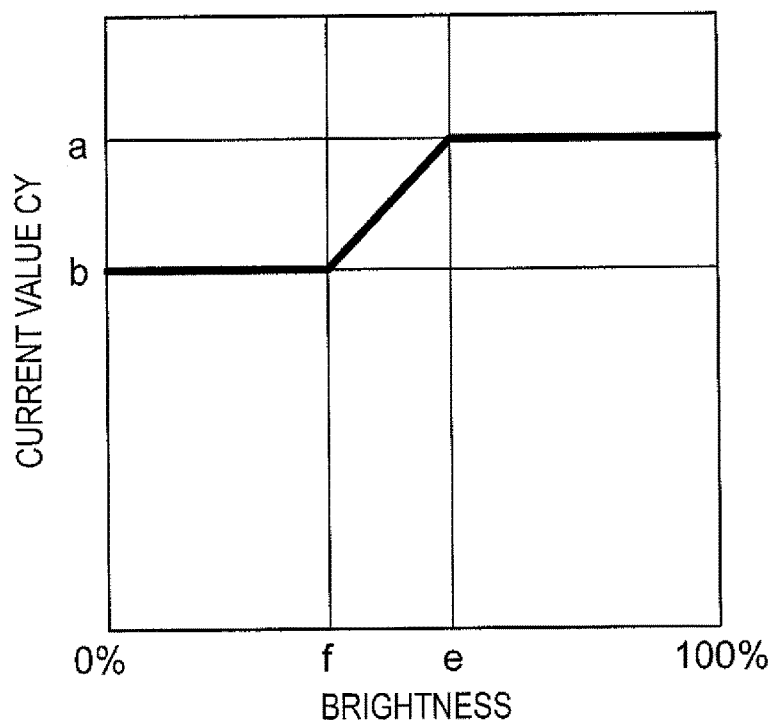
FIG. 14 shows contents stored in a first table.

First, the generation of the first table TB51 and the second table TB52 will be explained. The signal processing unit 110A specifies brightness e at a predetermined duty ratio c using the fourth duty ratio table TB41. The signal processing unit 110A sets the current value CY when the brightness is equal to or more than e to a (2.5 A) as shown in FIG. 14 in the first table TB51. Further, the signal processing unit 110A acquires the relationship between the brightness and the duty ratio when the brightness is equal to or more than e from the fourth duty ratio table TB41 and applies the acquired relationship to the second table TB52. Thereby, the range of (a) shown in FIG. 13 is applied to the range of (a) shown in FIG. 15.

Then, the signal processing unit 110A sets the current value CY to a and the duty ratio DY to c, and then, acquires the signal S1 output from the photodetector 36R and stores an amount of light sa represented by the acquired signal S1. Then, the signal processing unit 110A changes the current value CY to b with the duty ratio DY remaining c. The signal processing unit 110A changes the current value CY to b, and then, acquires the signal S1 output from the photodetector 36R and stores an amount of light sb represented by the acquired signal S1. The signal processing unit 110A calculates the image brightness f when changing the current value to b using the following equation (1).

$$\text{brightness } f = \text{brightness } e \times \frac{\text{amount of light } sb}{\text{amount of light } sa} \quad (1)$$

The signal processing unit 110A calculates the brightness f, and then, sets the current value when the brightness is less than f to b as shown in FIG. 14 in the first table TB51. Further, the signal processing unit 110A linearly interpolates between point (f,b) and point (e,a) as shown in FIG. 14 in the first table TB51, and obtains a relationship between the brightness and the current value CY in the range in which the brightness is equal to or more than f and less than e.

Figure 15:
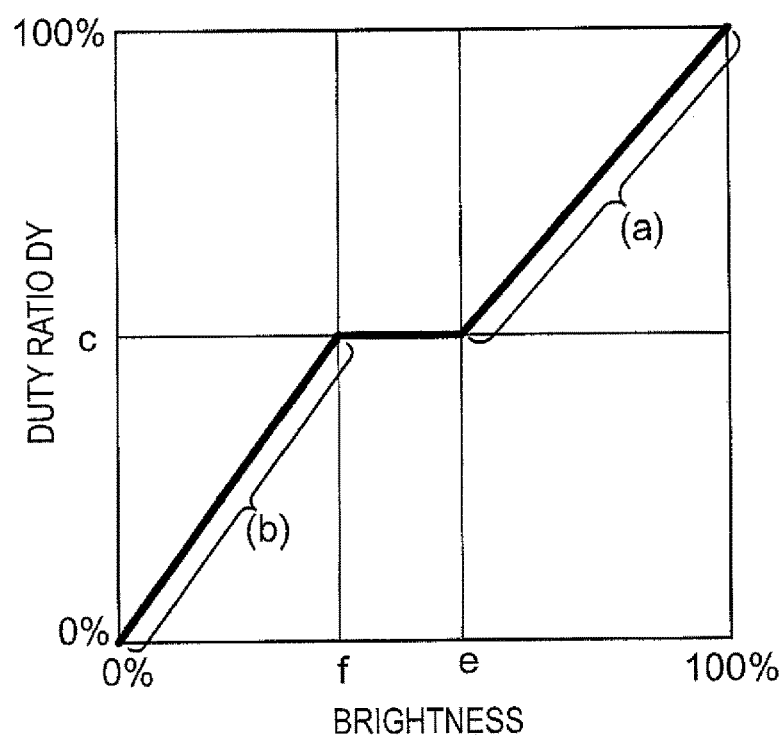
FIG. 15 shows contents stored in a second table.

Then, the signal processing unit 110A obtains a relationship between brightness and duty ratio DY when the brightness is less than e with respect to the second table TB52. First, the signal processing unit 110A sets the duty ratio DY in the range in which the brightness is equal to or more than f and less than e to c as shown in FIG. 15. Then, the signal processing unit 110A obtains a relationship between brightness h and duty ratio DY when the brightness is less than f.

Here, the signal processing unit 110A obtains the brightness h using the following equation (2), suppose that an arbitrary duty ratio less than c is g, the brightness when the duty ratio is g is h1, and the brightness when the duty ratio is c is f1 in the third duty ratio table TB31.

$$\text{brightness } h = \text{brightness } h1 \times \frac{\text{brightness } f}{\text{brightness } f1} \quad (2)$$

The signal processing unit 110A obtains the brightness using the equation (2) with respect to the range in which the duty ratio DY is equal to or more than 0% and less than c, and applies the relationship between the obtained brightness and the duty ratio to the range of (b) in FIG. 15 (the range from (0%, 0%) to point (f,c)). Further, the signal processing unit 110A performs linear interpolation from point (f,c) to point (e,c).

Then, the signal processing unit 110A generates the third table TB53 and the fourth table TB54. The signal processing unit 110A sets the current value CB when the brightness is equal to or more than e to a (2.5 A) like as in FIG. 14 in the third table TB53. Further, the signal processing unit 110A acquires the relationship between the brightness and the duty ratio when the brightness is equal to or more than e from the fourth duty ratio table TB41 and applies the acquired relationship to the fourth table TB54. Thereby, the range of (a) shown in FIG. 13 is applied to the range from point (e,c) to (100%, 100%) of the fourth table TB54 like the range of (a) in FIG. 15.

Then, the signal processing unit 110A sets the current value CB to a and the duty ratio DB to c, and then, acquires the signal S2 output from the photodetector 36B and stores an amount of light sa represented by the acquired signal S2. Then, the signal processing unit 110A changes the current value CB to b with the duty ratio DB remaining c. The signal processing unit 110A changes the current value CB to b, and then, acquires the signal S2 output from the photodetector 36B and stores an amount of light sb represented by the acquired signal S2. The signal processing unit 110A calculates the image brightness f when changing the current value to b using the above equation (1).

The signal processing unit 110A calculates the brightness f, and then, sets the current value when the brightness is less than f to b like as in FIG. 14 in the third table TB53. Further, the signal processing unit 110A linearly interpolates between point (f,b) and point (e,a) like as in FIG. 14 in the third table TB53, and obtains a relationship between the brightness and the current value CB in the range in which the brightness is equal to or more than f and less than e.

Then, the signal processing unit 110A obtains a relationship between brightness and duty ratio DB when the brightness is less than e regarding the fourth table TB54. First, the signal processing unit 110A sets the duty ratio DB in the range in which the brightness is equal to or more than f and less than e to c like as in FIG. 15. Then, the signal processing unit 110A obtains a relationship between brightness h and duty ratio DB when the brightness is less than f using the above equation (2) like as the second table TB52. The signal processing unit 110A obtains the brightness using the equation (2) with respect to the range in which the duty ratio DB is equal to or more than 0% and less than c, and applies the relationship between the obtained brightness and the duty ratio to the range from (0%, 0%) to point (f,c) of the fourth table. Further, the signal processing unit 110A performs linear interpolation from point (f,c) to point (e,c).

After generating the first table TB51 to the fourth table TB54, the signal processing unit 110A determines the current value CY based on the image brightness and the first table TB51 until the power is turned off, and outputs the determined current value CY to the excitation LD drive part 140. Further, the signal processing unit 110A determines the duty ratio DY based on the image brightness and the second table TB52, and outputs the determined duty ratio DY to the PWM part 120. Furthermore, the signal processing unit 110A determines the current value CB based on the image brightness and the third table TB53, and outputs the determined current value CB to the blue LD drive part 150. In addition, the signal processing unit 110A determines the duty ratio DB based on the image brightness and the fourth table TB54, and outputs the determined duty ratio DB to the PWM part 120.

Also, in the embodiment, when the duty ratio of the PWM signal is set to be larger, the current value of the PWM signal is set to be larger, and thus, reduction of amounts of red, green, and blue lights may be suppressed. Further, when the duty ratio of the PWM signal is set to be smaller, the current value of the PWM signal is set to be smaller, and thus, increase of amounts of red, green, and blue lights may be suppressed.

Note that, in the second embodiment, the current value CB is determined based on the third table TB53 and the duty ratio DB is determined based on the fourth table TB54, however, the current value CB may be fixed like the first embodiment and the duty ratio DB is determined based on the third duty ratio table TB31.

Further, in the second embodiment, the current value may be set to b when the duty ratio is less than d smaller than c. In this case, the signal processing unit 110A obtains brightness e1 when the duty ratio is d from the fourth duty ratio table TB41. Furthermore, the signal processing unit 110A measures the amount of light sa when the duty ratio is d and the current value is a and the amount of light sb when the duty ratio is d and the current value is b using the photodetectors, and obtains brightness f2 when the duty ratio is d and the current value is b from the following equation (3).

$$\text{brightness } f2 = \text{brightness } e1 \times \frac{\text{amount of light } sb}{\text{amount of light } sa} \quad (3)$$

Thereby, point (f2,d) in the second table TB52 and the fourth table TB54 is obtained. The signal processing unit 110A interpolates between point (f2,d) and point (e,c) in the second table TB52 and the fourth table TB54, linearly interpolates between the point (f2,d) and (0%, 0%), and generates the second table TB52 and the fourth table TB54. Further, f2 is obtained by the equation (3), and thus, the unit linearly interpolates between the point (f2,b) and the point (e,a) in the first table TB51 and the third table TB53, and generates the first table TB51 and the third table TB53.

Modified Examples

As above, the embodiments of the invention have been explained, and the invention is not limited to the above described embodiments, but may be implemented in other various forms. For example, the invention may be implemented by the following modification of the above described embodiments. Note that the above described embodiments and the following modified examples may be respectively combined.

In the above described embodiments, the device for image projection may not be limited to the transmissive liquid crystal light valve, but may be a reflective liquid crystal light valve, a DMD (Digital Mirror Device), or the like. Further, in the above described embodiments, the light source that emits light has been the laser diode, however, may be another than the laser diode as long as it is a solid-state light source.

In the above described embodiments, the yellow light LY has been spectroscopically separated into red light and green light, however, an illumination device having laser diodes emitting red light and an illumination device having laser diodes emitting green light may be provided, and red light output from the illumination device emitting red light may be guided to the reflective liquid crystal panel 4R and green light output from the illumination device emitting green light may be guided to the reflective liquid crystal panel 4G. Further, a phosphor emitting red light and a phosphor emitting green light may be provided, and light from the phosphor emitting red light may be guided to the reflective liquid crystal panel 4R and light from the phosphor emitting green light may be guided to the reflective liquid crystal panel 4G.

In the modified examples, the duty ratios and the current values may be determined with respect to the PWM signal for driving the laser diodes emitting red light and the PWM signal for driving the laser diodes emitting green light like the excitation laser diodes 62 of the first embodiment.

Further, when the configurations of the modified examples are employed in the second embodiment, a photodetector that detects the green light reflected by the polarization beam splitter 27 may be provided. Further, like the second embodiment, a table showing a relationship between brightness and current value and a table showing a relationship between brightness and duty ratio may be generated using the amount of light detected by the photodetector, and the duty ratio and the current value of the PWM signal for driving the laser diodes emitting green light may be determined based on the generated tables.

Note that the locations where the photodetectors are provided are not limited to the locations facing the cross dichroic prism 5 with the polarization beam splitters 26 to 28 in between, but may be other locations as long as they may detect lights.

In the above described embodiments, the current value CY has been set to the value in response to the brightness when the brightness is equal to or more than f and less than e, however, when the brightness is equal to or more than f and less than e, for example, the current value may be fixed to a value between a and b.

In the above described embodiments, the frequency of the PWM signal has been the same as the field frequency of the input image signal, however, the frequency of the PWM signal is not limited to the same frequency as the field frequency of the image signal, but may be a frequency higher than the field frequency.

Further, in the above described embodiments, a PWM signal formed by combining a first PWM signal at the equal frequency to the field frequency of the image signal and a second PWM signal at a higher frequency than the field frequency may be output to the excitation LD drive part 140 and the blue LD drive part 150. Furthermore, the duty ratio may be determined based on the ratio of the lighting period of the combined PWM signal to the field frequency of the image signal.

What is claimed is:

1. A display device comprising:
    a solid-state light source driven by a PWM signal;
    a light modulation device that modulates light emitted by the solid-state light source in response to an image signal; and
    a signal output unit that:
        determines a duty ratio and a current value of the PWM signal;
        outputs a PWM signal having a predetermined current value to the solid-state light source if the duty ratio is less than a predetermined threshold value; and
        outputs a PWM signal having a current value more than the predetermined current value and increasing as the duty ratio is increases, to the solid-state light source if the duty ratio is equal to or more than the predetermined threshold value.

2. The display device according to claim 1, wherein the signal output unit outputs a PWM signal having a second current value larger than the predetermined current value if the duty ratio is equal to or more than a second threshold value larger than the predetermined threshold value, and outputs a PWM signal having a current value less than the second current value and equal to or more than the predetermined current value in response to the duty ratio if the duty ratio is less than the second threshold value and equal to or more than the predetermined threshold value.

3. The display device according to claim 1, further comprising a photodetector that detects an amount of light emitted by the solid-state light source,
    wherein the signal output unit has a table in which a correspondence relationship between image brightness and the duty ratio is specified, updates the table in response to the amount of light detected by the photodetector, and determines the duty ratio of the PWM signal based on the updated table.

4. The display device according to claim 3, wherein the signal output unit updates the table by changing the brightness corresponding to the duty ratio of the predetermined threshold value in the table.

5. A method of controlling a display device including a solid-state light source driven by a PWM signal, and a light modulation device that modulates light emitted by the solid-state light source in response to an image signal, comprising:
    determining a duty ratio and a current value of the PWM signal;
    outputting a PWM signal having a predetermined current value to the solid-state light source if the duty ratio is less than a predetermined threshold value; and
    outputting a PWM signal having a current value more than the predetermined current value and increasing as the duty ratio is increases to the solid-state light source if the duty ratio is equal to or more than the predetermined threshold value.

6. A display device comprising:
    a solid-state light source driven by a PWM signal;
    a light modulation device that modulates light emitted by the solid-state light source in response to an image signal; and
    a signal output unit that:
        determines a duty ratio and a current value of the PWM signal;
        outputs a PWM signal having a predetermined current value to the solid-state light source if the duty ratio is less than a predetermined threshold value;
        outputs a PWM signal having a second current value larger than the predetermined current value if the duty ratio is equal to or more than a second threshold value larger than the predetermined threshold value; and
        outputs a PWM signal having a current value less than the second current value and equal to or more than the predetermined current value in response to the duty ratio if the duty ratio is less than the second threshold value and equal to or more than the predetermined threshold value.

7. The display device according to claim 6, further comprising a photodetector that detects an amount of light emitted by the solid-state light source,
    wherein the signal output unit has a table in which a correspondence relationship between image brightness and the duty ratio is specified, updates the table in response to the amount of light detected by the photodetector, and determines the duty ratio of the PWM signal based on the updated table.

8. The display device according to claim 7, wherein the signal output unit updates the table by changing the brightness corresponding to the duty ratio of the predetermined threshold value in the table.

* * * * *